June 8, 1965 P. E. DOUBLE ETAL 3,187,424
METHOD OF APPLYING A FASTENER
Filed May 3, 1961 2 Sheets-Sheet 1
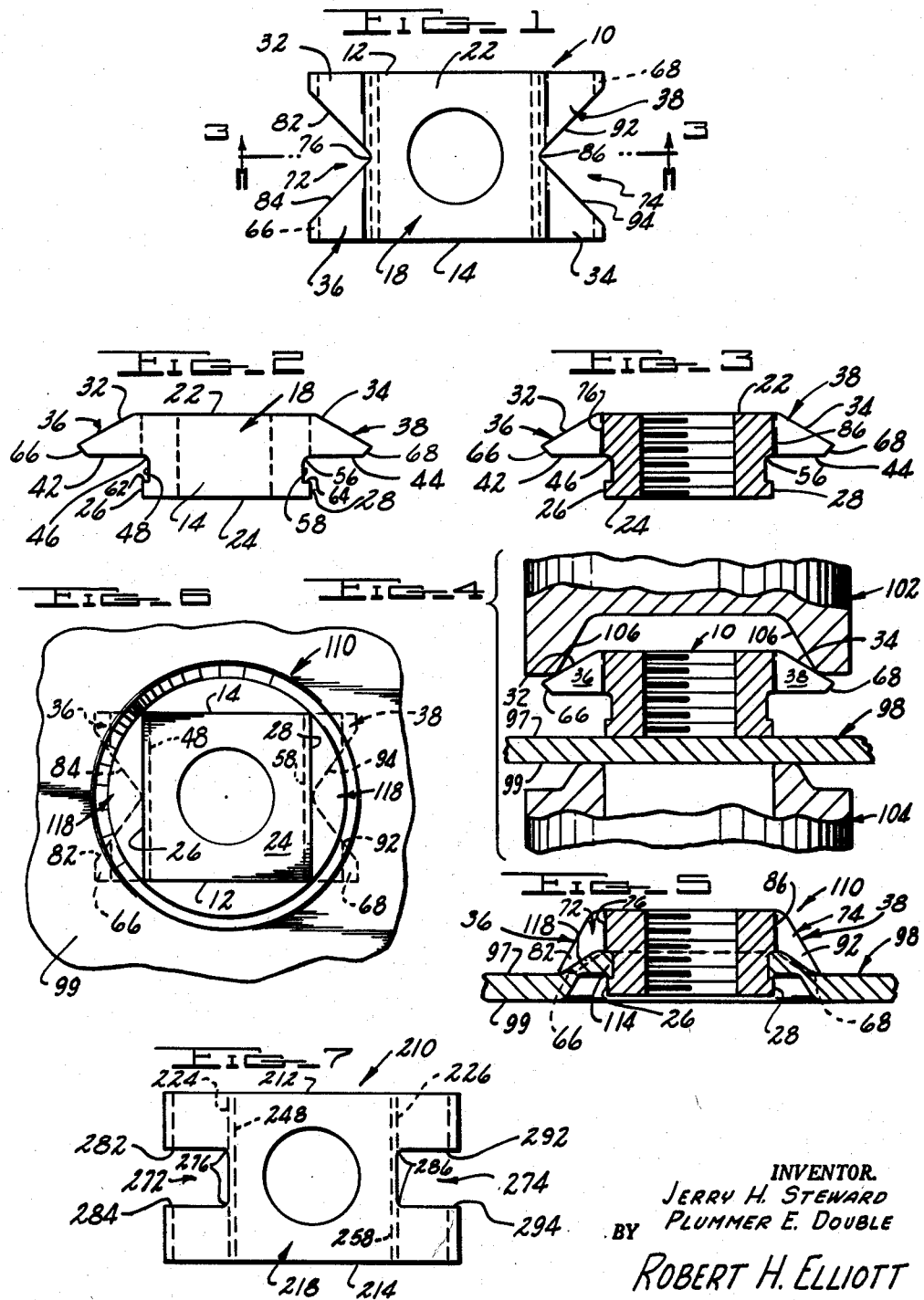
INVENTOR.
JERRY H. STEWARD
PLUMMER E. DOUBLE
BY
ROBERT H. ELLIOTT
AGENT

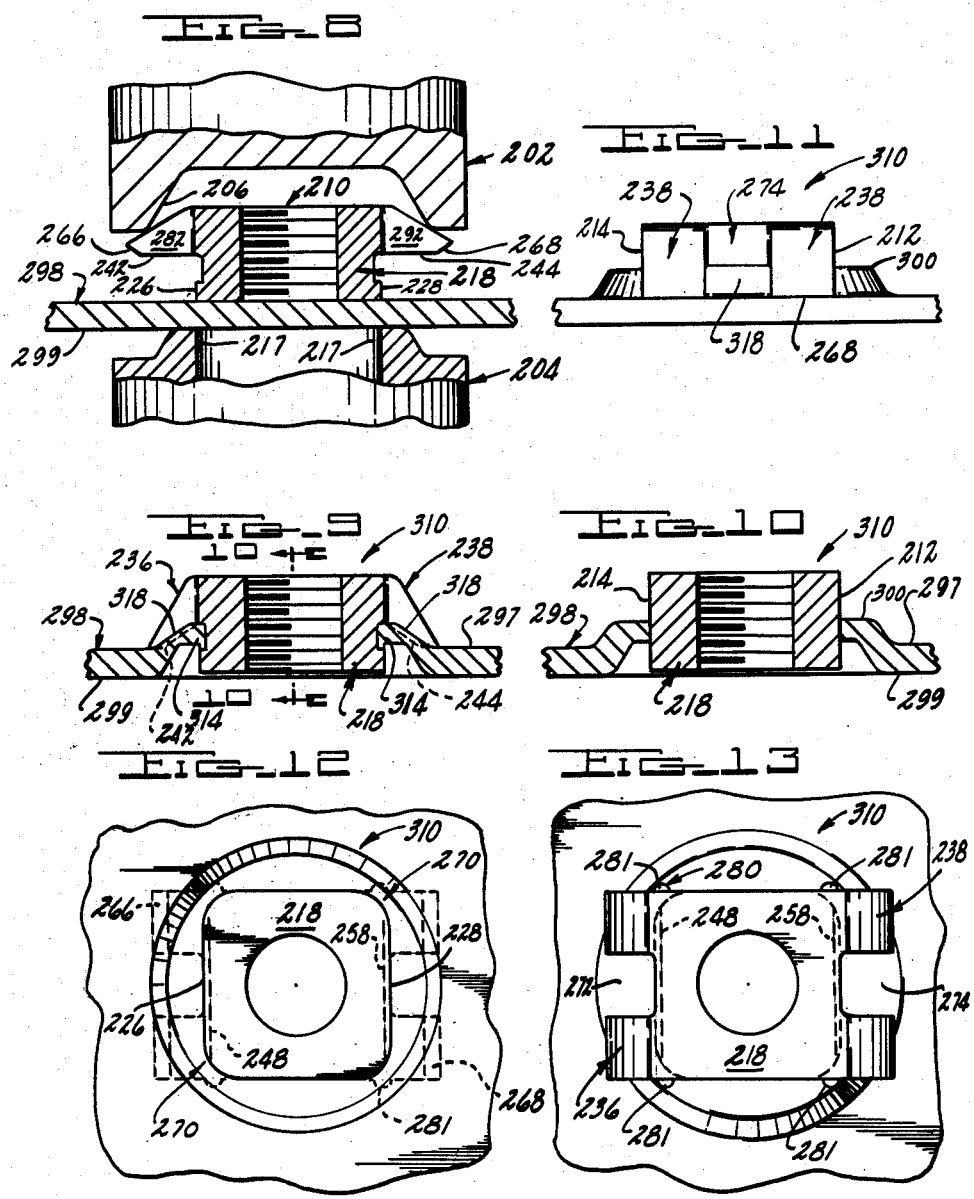

United States Patent Office 3,187,424
Patented June 8, 1965

3,187,424
METHOD OF APPLYING A FASTENER
Plummer E. Double, Detroit, and Jerry H. Steward, Bloomfield Hills, Mich., assignors to Multifastener Corporation, Redford, Mich.
Filed May 3, 1961, Ser. No. 107,509
2 Claims. (Cl. 29—432)

The present invention relates to new and useful improvements in a method of applying self piercing fasteners.

Various types of self piercing fastener constructions have been developed in an attempt to obtain a more secure bond between the fastener and the panel or part to which it is applied. Most sheet metal products that are manufactured in volume, are produced on high production equipment which involve, in most instances, several stamping operations. With the increased usage of thin (light gage) material, many serious problems have arisen. For the most part, these problems with which manufacturers are confronted can be solved by the use of the self piercing fastener.

While spot or projection welding is the most common method of assembly now in use, many assemblies afford conditions in which welding is entirely unsatisfactory. The inability of known welding methods to maintain a uniform attaching strength due to non-uniform material thickness creates a serious production problem. Heat generated during the welding process causes warpage which is also problem.

The necessity of conveying large and irregular shaped partially completed assemblies to the welding equipment also presents a handling problem, in that the conveying equipment required is foreign to the basic stamping operation. Because of the inherent difficulties which are constantly encountered in the welding operation, whenever and whenever possible, manufacturers have turned to other means of assembly and fastening.

Of the fastening methods currently in use, none have provided the opportunities for economical manufacture and assembly offered by the self piercing fastener method. These advantages will become apparent as the method of applying the self piercing fastener is reviewed.

A primary object of the present invention is the provision of a method of securing a self piercing fastener to a panel at a high rate of speed with existing equipment that is simple, durable and efficient.

Another object of this invention is the provision of a method of applying a rectangular shank fastener wherein the shank portion prevents rotation of the fastener in the panel on which it is secured.

A further object of the instant invention is the provision of a method of applying a self piercing fastener which is installed and embossed in a single step operation.

Another object of this invention is the provision of a method of applying a self piercing fastener which, after application, will have a superior holding quality, while the possibility of distortion and pull through is virtually eliminated.

Another object of this invention is the provision of a method of applying a self piercing fastener wherein the stress concentration in the fastener and panel is held to a minimum.

The above and other objects can be accomplished by the provision of a self piercing fastener having a generally rectangular body shank; substantially flat and parallel faces on said body shank; a pair of laterally extending flanges on two opposite sides of said body shank, the lower surfaces thereof located in generally parallel relationship to the upper and lower surfaces of said body shank, the upper surfaces of each of said flanges depends downwardly from the shank; intermediate the downwardly divergent upper surfaces of the flanges and the lower surfaces thereof is a second angular surface which extends upwardly; a cut away section on the ends of each of the flanges; an undercut in the sides of said shank below each of said flanges; the lower edges of said shank forming a cutting edge to pierce an opening in a panel member when said fastener is positioned on a panel in a preselected location over a hollow die button beneath a contoured ram, movement of said contourned ram permits engagement of the angular portion of said flanges with the ram, continued movement of said ram moving the shank portion of said fastener through said panel to form an opening therein while simultaneously forming an embossure in said panel and displacing material from said panel into the undercut portions of said fastener, the flange portion being deformed by the contoured ram in a manner to engage the outer surface of said embossure.

Other objects of this invention will appear in the following description and appended claims, reference being had to the accompanying drawings forming a part of this specification wherein like reference characters designate corresponding parts in the several views.

In the drawings:

FIG. 1 is a plan view of a self piercing fastener which embodies the present invention.

FIG. 2 is an elevational view of the self piercing fastener shown in FIG. 1.

FIG. 3 is a cross sectional view taken on lines 3—3 of FIG. 1.

FIG. 4 is a cross sectional view through the apparatus used to apply the fastener to the panel.

FIG. 5 is cross sectional view similiar to FIG. 3 which shows the fastener secured to a panel member.

FIG. 6 is a bottom view of FIG. 5 with the panel broken away.

FIG. 7 is a modified form of the fastener shown in FIG. 1.

FIG. 8 is a cross sectional view taken through a modified form of the apparatus.

FIG. 9 is a cross sectional view through the modified fastener shown in FIG 7 as applied with the modified apparatus FIG. 10 is a cross sectional view taken on lines 10—10 of FIG. 9.

FIG. 11 is an end elevational view of the modified fastener secured to a panel member.

FIG. 12 is a bottom view of the fastener assembly shown in FIG. 9.

FIG. 13 is a top view of the fastener assembly shown in FIG. 9.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, FIGS. 1 and 2 illustrate a plan and elevational view respectively of the self piercing fastener 10 which embodies the present invention. The fastener 10 is of generally rectangular configuration. The longitudinal sides 12 and 14 of the fastener 10 lie in substantially parallel relationship, as do the upper and lower surfaces 22 and 24 of the shank body portion 18. Extending laterally from the shank body 18 and on two opposed vertical sides 26 and 28 thereof, are flange members 36 and 38. The end sections of the upper surfaces 32 and 34 of the flanges 36 and 38 depend angularly downward and outwardly from the upper generally flat top surface 22 of the shank 18, while the lower surfaces 42 and 44 of the flanges are in substantially parallel relationship thereto. The body shank portion 18 of the fastener 10 is of generally symmetrical configuration and is undercut immediately below surfaces 42 and 44 of the flanges 36 and 38. A first radius 46 is found at the intersection of surface 42 with the vertical surface 48 on the shank 18 and a second radius 56 is found at the intersection of surfaces 44 with vertical surface 58. Both of the undercut surfaces 48 and 58 are generally parallel and located in predetermined spaced relationship to the vertical sides 26 and 28 on the shank 18. Immediately adjacent to the flange surfaces 42 and 44 are located two aligned and generally flat horizontal surfaces 62 and 64. Surface 62 intersects the vertical surfaces 26 and 48 of the shank 18 at right angles and surface 64 intersects the corresponding vertical surfaces 28 and 58 located adjacent thereto. While the undercut portions are described as being generally parallel, they can of course be angularly divergent without departing from the scope of the invention.

Intermediate the angular surfaces 32 and 34 of the flanges 36 and 38 and the under surfaces 42 and 44 thereof, is a generally flat surface 66 on the left and 68 on the right. The intersection of surface 32 with surface 66 defines the right edge of the fastener while the corresponding intersection of surfaces 34 and 68 define the left edge.

Referring to FIG. 1 again, it will be noted that the central portions 72 and 74 of the flanges 36 and 38 are cut away. A third radius 76 is found at the intersection of the adjacent flat surfaces 82 and 84 and a fourth radius 86 is found intermediate the intersection of the corresponding flat surfaces 92 and 94. Radii 76 and 86 are positioned substantially along the longitudinal center line of the fastener and are located perpendicularly to the vertical edges 26 and 28 of the shank 18. The root of each radius is in line with the edge surfaces 26 and 28 of the shank body 18. This relationship is best viewed in FIG. 3 of the drawings.

FIG. 4 of the drawings relates to the method of applying the above described part. The first step in the present method consists of positioning the fastener 10 on a flat panel 98 beneath a contoured ram 102.

The panel 98 is positioned on a hollow die button anvil 104 which has the same general configuration as the shank 18 of the fastener 10. The contoured ram 102 is then moved down to engage the fastener, with the edges of the angular portions 106 of the contoured ram 102 engaging the angular divergent sections 32 and 34 of the fastener. The edges of the shank 18 then act as a punch to pierce an opening in the panel 98. Continued movement of the contoured ram 102 downwardly, deforms the flanges 36 and 38 into contact with the upper surface 97 of the panel 98, while the underside of the panel 99 is deformed and the edges of the opening are displaced to engage the undercut sections, so as to thereby form an embossment within the confines of the extremities of the fastener proper.

The resultant assembly 110 is shown in FIG. 5 of the drawings. The material 114 is displaced from the panel 98 cold flows into the undercut sections, while the material 118 between the cut away end sections 72 and 74 flows in a manner as to engage the surfaces 82, 84, 92 and 94 thereof respectively. The flat sections 66 and 68 intermediate surfaces 32 and 42 and 34 and 44 are moved into engagement with the upper surface 97 of the panel 98 when the flanges 36 and 38 are deformed.

The configuration of the underside of the finished assembly 110 is shown in FIG. 6 of the drawings. From this drawing, it will be appreciated that the finished assembly is simple, durable and inexpensive and that the formation of the embossment within the confines of the extremities of the fastener proper will result in a product wherein deformation of the panel, as a result of high loading will be substantially reduced. When the fastener of the present invention is applied in the manner taught, no crushing or undesirable distortion of the fastener occurs as has been encountered in the past.

The fastener 210 shown in FIG. 7 of the drawings is generally the same as that shown in FIG. 1, with the ends 272 and 274 cut away in parallel relationship to the longitudinal side. The depth of the cut away sections 272 and 274 is of such dimension as to be in alignment with the vertical surfaces 224 and 226 of the shank 218. The edges 282, 284, 292 and 294 of the cut away sections are in alignment with each other, and are located in generally parallel relationship with the longitudinal sides 212 and 214. The undercut 248 and 258 are formed in the same manner previously described. The radii 276 and 286 are likewise between the cut away portions 272 and 274 of flanges 236 and 238.

FIG. 8 of the drawing illustrates the modified fastener 210, as applied with the use of slightly modified tooling. The operation is generally the same as that previously described, with the one exception that the die button 204 is of slightly different configuration than the configuration of the shank 218. The corners 217 thereof have a radius therein. As the ram 202 is moved downwardly, the shank 218, acting as a punch, is moved through the panel 298. Continued movement of the contoured ram 202, permits the die button 204 to cut away the four corners of the shank 218 and displaces the material cut therefrom, into the panel member 298 to form a densified area 270 adjacent thereto. In addition, the material displaced from the fastener 210 manifests itself on the opposite side 297 of the panel 298 in the form of tabs 280. One tab 281 is formed at each corner thereof, and provides a structural reinforcement, at the point of highest stress concentration.

The finished fastener assembly 310 is illustrated in the remaining FIGS. 9–13 of the drawings. FIG. 9 shows a cross section taken along the longitudinal center line of the finished product. The panel material 314 is flowed into the undercut sections as well as between the cut away ends 272 and 274 as shown at 318. The cross sectional configuration of the embossment 300 is shown in FIG. 10 and was taken at substantially right angles to the cross section shown in FIG. 9. It will be noted that the material flows in the same manner of occurrence as in FIG. 9. No undercut is formed along the longitudinal edges 212 and 214 of the fastener.

FIG. 11 shows the end elevation of the fastener assembly 310 as applied to a panel 298 while FIGS. 12 and 13 show the underside and top respectively of a finished assembly. The configuration of the opening in die button 204 is the same as the configuration of the shank 218. The densified portion 270 adjacent to each of the cut away corners is substantially stronger than the first structure described and the finished product more equally distributes the stress loads throughout the panel and part.

The above described structure is an advance in the art. Distortion of the panel as a result of loading is minimized and the load capacity of the fastener is substantially increased. In addition, the load is more uniformly distributed. The radii in the cut away sections of the flanges, as well as in the undercut sections of the fastener reduces the possibility of fracture within the parts as a result of deformation during application and usage. The resulting fastener assembly is inexpensive, lighter in weight and more durable than fasteners which are now available.

Having thus described our invention, we claim:

1. In a method of securing a threaded fastener to a panel, the panel being interposed between said fastener and a die button, said threaded fastener having a rectangular piercing face joined by a shank to oppositely directed flanges having stop surfaces substantially normal to the longitudinal axis of said fastener, said shank having grooves immediately adjacent the flanges, said grooves being interposed between the stop surfaces and the piercing face of said fastener, said die button having an aperture coresponding substantially to the shape of said piercing face and an embossing portion circumscribing said aperture, the steps performed in a single uninterrupted motion of the fastener relative to the panel of (1) piercing said fastener piercing face through said panel and into said die button aperture to form an opening in said panel, (2) swaging into said grooves a portion of said panel member adjacent said opening and confined between said die button and said flanges, and (3) deforming the stop flanges toward said piercing face and into extended surface engagement with the adjacent surface of said panel, thereby deforming the panel portions outwardly of said die button embossing portion in the direction of nut movement relative to the panel so that that portion of the panel immediately surrounding said aperture therein is embossed.

2. In a method of securing to a panel member a threaded fastener having a rectangular piercing face joined by a shank to oppositely directed flanges having stop surfaces substantially normal to the longitudinal axis of the fastener, said shank having grooves immediately adjacent the flanges and interposed between said stop surfaces and said piercing face, the steps of interposing the panel between said fastener and a die button having an aperture substantially corresponding to the shape of said piercing face and displacing the fastener in a single uninterrupted motion relative to the panel, (1) to pierce said fastener piercing face through said panel and into the die button aperture to form an opening in said panel, (2) to swage into said grooves a portion of said panel member adjacent said opening and confined between said die button and said flanges, and (3) to deform the stop flanges and those portions of the panel in contact therewith toward said piercing face and into extended surface engagement with the adjacent surface of said panel while (4) supporting on said die button against such deformation those portions of the panel and those portions of said flanges immediately adjacent the die button aperture, so that the deformation of the stop flanges also embosses the panel.

References Cited by the Examiner
UNITED STATES PATENTS

| | | | |
|---|---|---|---|
| 1,872,385 | 8/32 | Andren | 151—41.72 |
| 2,108,975 | 2/38 | Sorensen | 151—41.72 |
| 2,707,322 | 5/55 | Strain et al. | 29—432 |
| 2,749,606 | 6/56 | Donahue | 29—432 |
| 2,750,660 | 6/56 | Newcomb | 29—432 |

WHITMORE A. WILTZ, *Primary Examiner.*

CARL W. TOMLIN, *Examiner.*